US008455073B2

(12) United States Patent
Hodsdon et al.

(10) Patent No.: US 8,455,073 B2
(45) Date of Patent: *Jun. 4, 2013

(54) LABEL SHEET CONSTRUCTION AND METHOD

(75) Inventors: Jerry G. Hodsdon, Forestdale, MA (US); Jennifer Lynn Dean, Corona, CA (US)

(73) Assignee: Avery Dennison Corporation, Pasadena, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/579,377

(22) Filed: Oct. 14, 2009

(65) Prior Publication Data

US 2010/0080946 A1    Apr. 1, 2010

Related U.S. Application Data

(63) Continuation of application No. 09/954,621, filed on Sep. 17, 2001, now Pat. No. 7,625,619.

(60) Provisional application No. 60/237,102, filed on Sep. 29, 2000.

(51) Int. Cl.
*B32B 9/00* (2006.01)
*G09F 3/10* (2006.01)
*B65D 65/28* (2006.01)

(52) U.S. Cl.
USPC ....... 428/40.1; 428/42.1; 428/42.2; 428/42.3; 428/43; 40/299.01; 40/360; 40/638; 40/672

(58) Field of Classification Search
USPC ..... 428/40.1, 41.8, 42.1–42.3, 43; 40/299.01, 40/360, 638, 673
See application file for complete search history.

(56) References Cited

U.S. PATENT DOCUMENTS

| D2,856 | S | 12/1867 | Stafford |
| D79,566 | S | 10/1929 | Rau |
| D120,517 | S | 3/1940 | Steffen |
| 2,420,045 | A | 5/1947 | Krug |
| D168,758 | S | 2/1953 | Odzer |
| 2,883,044 | A | 4/1959 | Kendrick |

(Continued)

OTHER PUBLICATIONS

Restriction Requirement dated Jan. 28, 2003 from prior U.S. Appl. No. 09/954,621.

(Continued)

*Primary Examiner* — Patricia Nordmeyer
(74) *Attorney, Agent, or Firm* — Christie, Parker & Hale, LLP

(57) ABSTRACT

A label sheet construction including a liner sheet and a facestock sheet releasably adhered to the liner sheet. A plurality of labels and fold lines are die cut in the facestock sheet but not the liner sheet. The fold lines extend between the labels. After the sheet construction has been passed through a printer or copier and the desired indicia printed on the labels, the construction (an upper portion thereof) is bent back along one of the fold lines. This separates a(n) (upper) portion of the label from the underlying liner sheet. The user then easily grasps the upper portion and peels the label off of the liner sheet without tearing the label. When the label has a burst design, it is preferable to have a pair of fold lines for folding the liner sheet away from a portion of the label. The burst design preferably has alternating long and short points.

19 Claims, 5 Drawing Sheets

U.S. PATENT DOCUMENTS

| | | | |
|---|---|---|---|
| D189,472 S | 12/1960 | Currie et al. | |
| D190,360 S | 5/1961 | Cohen et al. | |
| 3,038,597 A | 6/1962 | Brady, Jr. | |
| 3,315,387 A | 4/1967 | Heuser | |
| 3,361,252 A | 1/1968 | Wise | |
| 3,568,829 A | 3/1971 | Brady, Jr. | |
| 4,004,362 A * | 1/1977 | Barbieri | 40/316 |
| 4,061,808 A | 12/1977 | Sato | |
| 4,188,251 A | 2/1980 | Grass | |
| 4,454,180 A | 6/1984 | La Mers | |
| 4,619,851 A | 10/1986 | Sasaki et al. | |
| 4,787,158 A | 11/1988 | Vitol | |
| D300,692 S | 4/1989 | le Brocquy | |
| 4,850,612 A | 7/1989 | Instance | |
| D306,321 S | 2/1990 | Gramera | |
| 5,332,265 A | 7/1994 | Groess et al. | |
| 5,782,494 A | 7/1998 | Crandall et al. | |
| 5,788,284 A | 8/1998 | Hirst | |
| 5,993,928 A | 11/1999 | Popat | |
| 6,149,518 A | 11/2000 | Farrow | |
| 6,277,229 B1 | 8/2001 | Popat | |
| 6,479,118 B1 | 11/2002 | Atkinson | |
| D482,073 S | 11/2003 | Nakajo et al. | |
| 7,374,631 B1 * | 5/2008 | Weirather et al. | 156/248 |
| D17,746 S | 12/2009 | Mellinger | |
| 2003/0133098 A1 | 7/2003 | Hoshino et al. | |

OTHER PUBLICATIONS

Amendment dated Feb. 13, 2003 from prior U.S. Appl. No. 09/954,621.
Non-final rejection dated Mar. 26, 2003 from prior U.S. Appl. No. 09/954,621.
Amendment dated Aug. 4, 2003 from prior U.S. Appl. No. 09/954,621.
Final rejection dated Oct. 21, 2003 from prior U.S. Appl. No. 09/954,621.
Amendment dated Jan. 21, 2004 from prior U.S. Appl. No. 09/954,621.
Notice re noncompliant amendment dated Feb. 17, 2004 from prior U.S. Appl. No. 09/954,621.
Amendment dated Mar. 3, 2004 from prior U.S. Appl. No. 09/954,621.
Final rejection dated May 18, 2004 from prior U.S. Appl. No. 09/954,621.
Non-final rejection dated Jul. 15, 2004 from prior U.S. Appl. No. 09/954,621.
Amendment dated Jul. 20, 2004 from prior U.S. Appl. No. 09/954,621.
Final rejection dated Oct. 1, 2004 from prior U.S. Appl. No. 09/954,621.
Amendment dated Nov. 29, 2004 from prior U.S. Appl. No. 09/954,621.
Non-final rejection dated Feb. 23, 2005 from prior U.S. Appl. No. 09/954,621.
Amendment dated Jun. 27, 2005 from prior U.S. Appl. No. 09/954,621.
Final rejection dated Sep. 23, 2005 from prior U.S. Appl. No. 09/954,621.
Amendment dated Nov. 18, 2005 from prior U.S. Appl. No. 09/954,621.
Non-final rejection dated Feb. 9, 2006 from prior U.S. Appl. No. 09/954,621.
Amendment dated Jul. 12, 2006 from prior U.S. Appl. No. 09/954,621.
Amendment dated Aug. 10, 2006 from prior U.S. Appl. No. 09/954,621.
Final rejection dated Oct. 31, 2006 from prior U.S. Appl. No. 09/954,621.
Examiner's interview summary dated Mar. 27, 2007 from prior U.S. Appl. No. 09/954,621.
RCE/Amendment dated Mar. 30, 2007 from prior U.S. Appl. No. 09/954,621.
Non-final rejection dated Jun. 13, 2007 from prior U.S. Appl. No. 09/954,621.
Amendment dated Sep. 13, 2007 from prior U.S. Appl. No. 09/954,621.
Supplemental amendment dated Sep. 27, 2007 from prior U.S. Appl. No. 09/954,621.
Final rejection dated Dec. 12, 2007 from prior U.S. Appl. No. 09/954,621.
Amendment dated Mar. 11, 2008 from prior U.S. Appl. No. 09/954,621.
Notice of allowance dated Apr. 2, 2008 from prior U.S. Appl. No. 09/954,621.
Non-final rejection dated Jul. 15, 2008 from prior U.S. Appl. No. 09/954,621.
Amendment dated Jan. 14, 2009 from prior U.S. Appl. No. 09/954,621.
Notice of allowance dated Mar. 27, 2009 from prior U.S. Appl. No. 09/954,621.
Notice of allowance dated Jul. 16, 2009 from prior U.S. Appl. No. 09/954,621.
Office action dated Jun. 24, 2008 from corresponding European Application No. 01977837.2.
Response dated Oct. 23, 2008 from corresponding European Application No. 01977837.2.
US D514,164 in Feb. 17, 2005 *Ex Parte Quayle Action*; Lawyer's Seal "A", Dennison Manufacturing Company 1913-1914 Tags and Specialties Catalog, p. 71.
US D514,164 in Feb. 17, 2005 *Ex Parte Quayle Action*; Starburst Graphic #22, Admart Brochure, Admart, 20 Gose Pike, Danville, KY 40422.
International Search Report issued Apr. 4, 2002 from corresponding International Application No. PCT/US01/42357.
International Preliminary Examination Report issued Mar. 29, 2003 from corresponding International Application No. PCT/US01/42357.
Supplemental Search Report issued Mar. 30, 2007 from corresponding European Application No. 01977837.2.
Notice of Allowance dated Jun. 2, 2005 from related U.S. Appl. No. 29/148,672, which is a continuation of the present application.
Notice of Allowance dated Sep. 10, 2002 from U.S. Appl. No. 29/148,697.
Office Action dated Feb. 28, 2003 from related Mexican Application No. Pa/f/2002/000319, which corresponds to U.S. Appl. No. 29/148,672, which is a continuation of the present application.
Notice of Allowance dated Jul. 8, 2003 from related Mexican Application No. Pa/f/2002/000319, which corresponds to U.S. Appl. No. 29/148,672, which is a continuation of the present application.
Office Action dated Apr. 9, 2003 from Mexican Application No. Pa/f/2002/000318, which corresponds to U.S. Appl. No. 29/148,697.
Notice of Allowance dated Aug. 18, 2003 from Mexican Application No. Pa/f/2002/000318, which corresponds to U.S. Appl. No. 29/148,697.
Letratone Sheet LT854, Letraset Reference Manual, 1983, p. 263. Applicant is unable to locate document.
Starburst Clip Art Sheets, Dover Clip Art—Starbursts, 1986, p. 3 and 26. Applicant is unable to locate document.
CIPO Request Dec. 28, 2001 from corresponding Canadian Application for Self-Adhesive Label; CIPO Ref. 2001-2335; Subsequent documents from CIPO for this application will indicate Application No. 97573.
Response to CIPO dated Apr. 22, 2002 from corresponding Canadian Application for Self-Adhesive Label; CIPO Ref. 2001-2335; Subsequent documents from CIPO for this application will indicate Application No. 97573.
CIPO Examiner Report dated Dec. 5, 2002 from corresponding Canadian Application No. 97573 for Self-Adhesive Label.
Response to CIPO dated Feb. 4, 2003 from corresponding Canadian Application No. 97573 for Self-Adhesive Label.
CIPO Registration No. 97573 issued Apr. 24, 2003 from corresponding Canadian Application No. 97573 for Self-Adhesive Label.
Corresponding Canadian Application for Self-Adhesive Label as filed on Sep. 28, 2001.

CIPO Examiner Report dated Dec. 5, 2002 from corresponding Canadian Application No. 97574 for Label Sheet.
Response to CIPO dated Feb. 4, 2003 from corresponding Canadian Application No. 97574 for Label Sheet.
CIPO Examiner Report dated Feb. 12, 2003 from corresponding Canadian Application No. 97574 for Label Sheet.
Response to CIPO dated Apr. 4, 2003 from corresponding Canadian Application No. 97574 for Label Sheet.
CIPO Registration No. 97574 issued Apr. 24, 2003 from corresponding Canadian Application No. 97574 for Label Sheet.
Corresponding Canadian Application for Label Sheet as file on Sep. 28, 2001 and amended on Apr. 4, 2003.
Invitation to Amend Application Issued in European Application No. 01977837, dated May 26, 2003, 2 pgs.
Amendment in European Application No. 01977837, dated Jun. 30, 2003, 10 pgs.
Amendment in European Application No. 01977837, dated Jul. 3, 2003, 10 pgs.
Office Action in European Application No. 01977837, dated Jan. 14, 2010, 4 pgs.
Notice of Withdrawal in European Application No. 01977837, dated Jun. 29, 2010, 1 pg.
Request for Continued Examination in U.S. Appl. No. 09/954,621, dated Jul. 1, 2008, 3 pgs.
Request for Continued Examination in U.S. Appl. No. 09/954,621, dated Jun. 25, 2009, 3 pgs.
Ex Parte Quayle Action in U.S. Appl. No. 29/148,672, dated Feb. 17, 2005, 4 pgs.
Amendment in U.S. Appl. No. 29/148,672, dated May 19, 2005, 5 pgs.

* cited by examiner

LABEL SHEET CONSTRUCTION AND METHOD

CROSS-REFERENCE TO RELATED APPLICATIONS

This application is a continuation of U.S. application Ser. No. 09/954,621, filed Sep. 17, 2001, now U.S. Pat. No. 7,625,619, which claims the benefit of U.S. Provisional Application No. 60/237,102, filed Sep. 29, 2000. Both U.S. application Ser. No. 09/954,621 and U.S. Provisional Application No. 60/237,102 are hereby incorporated by reference in their entireties.

BACKGROUND OF THE INVENTION

The present invention relates to label sheet constructions and particularly those having a plurality of labels cut in a facestock sheet wherein the facestock sheet is releasably adhered to a liner sheet. The label sheet construction is adapted to be fed into a printer or copier and the desired indicia printed on the labels, and the printed labels then peeled off of the liner sheet by the user and applied to a desired surface, such as an envelope, packaging or literature.

Commercially successful label sheet constructions include the sheets of round and rectangular labels available from Avery Dennison Corporation of Pasadena, Calif. These sheet constructions comprise a facestock sheet adhered with adhesive to a liner base paper sheet having a silicone coating. The facestock sheet is die cut to form an array of identical labels. Narrow approximately one-quarter inch wide strips of the facestock sheet are cut and removed from the side edges of the sheet to assist in feeding the sheet constructions into printers from feed trays.

The sheet construction is hand fed or automatically fed from a stack of same into a printer or copier and the desired indicia printed on the labels. Since the labels can be spaced from one another with facestock sheet surrounding them, a "full-bleed" design can be provided allowing the user to print to the edge of the labels. After the printing operation, the printed labels are then peeled off of the liner sheet by the user and applied with their adhesive backing to the desired surface, such as on an envelope or package.

SUMMARY OF THE INVENTION

Disclosed herein are an improved label sheet construction, a method of removing labels therefrom and a method of manufacturing same. The construction includes a facestock sheet releasably adhered to a liner sheet. The facestock sheet is die cut to form an array of spaced labels, and weakened fold lines are also formed on the facestock sheet between the labels and between end/edge labels and adjacent edges of the facestock sheet. The weakened fold lines are preferably die cut lines passing through the facestock sheet to the liner sheet. They extend between the labels but not through them and together define a line which passes through a row or column of the labels from one edge of the sheet to the other. After the sheet construction has passed through a printer or copier and the desired indicia printed on the labels, (the top (or bottom or side) portion of) the sheet is folded back along the line, thereby separating (top or less preferably bottom or side) portions of each of the labels in that row or column from the underlying liner sheet. The separated label portions can then be easily grasped by the user and the labels pulled or peeled off from the liner sheet for application by the user to the desired new surface using the adhesive on the back of the label. The next row (or column) of labels is similarly removed by folding on the associated line.

By initially separating a portion of the label, it makes it easier for the user to grasp the label for removal from the sheet. In addition, it makes it less likely that the user, when the attempts to grasp and remove the (printed) label, will tear off the initially grasped portion. This is especially true for labels shaped as bursts with pointed portions that are easily torn off. In fact for burst labels of this invention in particular, a preferred construction has two parallel spaced fold lines, which help to better separate the label portion from the underlying liner sheet. These folding, grasping and peeling steps are repeated for each row of labels on the sheet.

Other objects and advantages of the present invention will become more apparent to those persons having ordinary skill in the art to which the present invention pertains from the foregoing description taken in conjunction with the accompanying drawings.

DETAILED DESCRIPTION OF PREFERRED EMBODIMENTS OF THE INVENTION

Figure 1:
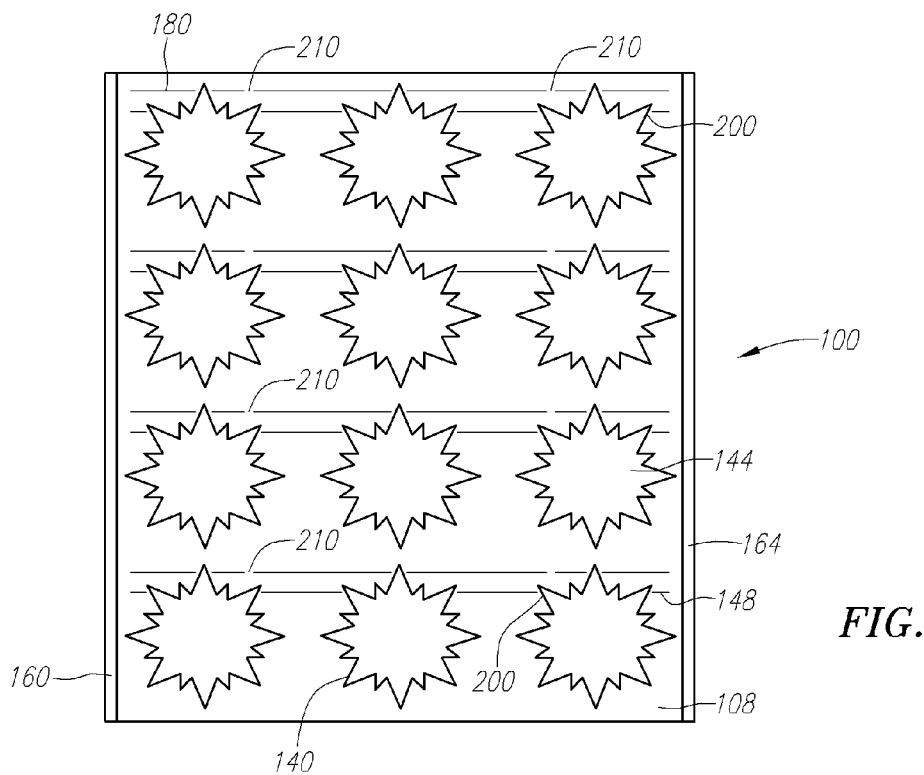
FIG. 1 is a front plan view of a label sheet construction of the present invention.

Referring to the drawings, a label sheet construction of the present invention is illustrated generally at 100. The sheet construction 100, referring to FIG. 2, includes a liner sheet 104 to which a facestock sheet 108 is adhered with a layer of adhesive 112. The liner sheet 104 includes a liner base paper 116 having a silicone release coating 120. The facestock sheet 108 preferably has a top coating 124, which makes the top surface thereof more receptive to ink jet or laser printing (as is known in the art). The label sheet construction 100 may be provided to the consumer with printing 128 on the back (or bottom) surface, such as the manufacturer's logo. Similarly, printing 132 on the front (or top) surface may be provided, such as the manufacturer's trademark or product identification information, e.g., "Ink Jet—Large Burst Labels, 2¼ [or 1½] Inch Diameter." Thus, the top or front view of the label sheet construction 100 is shown in FIG. 1, and the bottom or rear view is a plain rectangular sheet (with printing thereon, if desired).

Die cut lines 136 are formed in and through the facestock sheet 108 and to the adhesive layer 112 to form the perimeters 140 of the labels and to form the "fold" lines 148. Instead of being die cut lines, the label lines 140 and the fold lines 148 can be other types of weakened separation lines, such as microperforation lines. Also, the label lines 140 and fold lines 148 can be different types of lines and can be formed in different manufacturing steps. Preferably, however, they are both die cut lines formed in a single die cut step, as will be explained in detail later.

The present invention covers a wide range of facestocks, liners and adhesives. For printing in ink jet printers, the total caliper on the construction 100 preferably should not be less than two mils (0.002") and not more than ten mils (0.010"). However, other applications for hand applied labels that do not require printing in ink jet or laser printers, can go well beyond these parameters. Additionally, the facestock sheet 108 may or may not have a top coatings 124. Although release liner sheets 104 are typically silicone based, other formulations are within the scope of this invention. Other top coatings can include metallized foils, holographic film, and coatings for printing on films. In addition, the paper substrate can be replaced with a plastic film (clear, opaque white, metallized, holographic or other), which then may or may not have a top coating on it. The label sheet construction 100 is also preferably 8½ by eleven inches but may be 8½ by fourteen inches, A4 size or other sizes as would be apparent to those skilled in the art.

Figure 3:
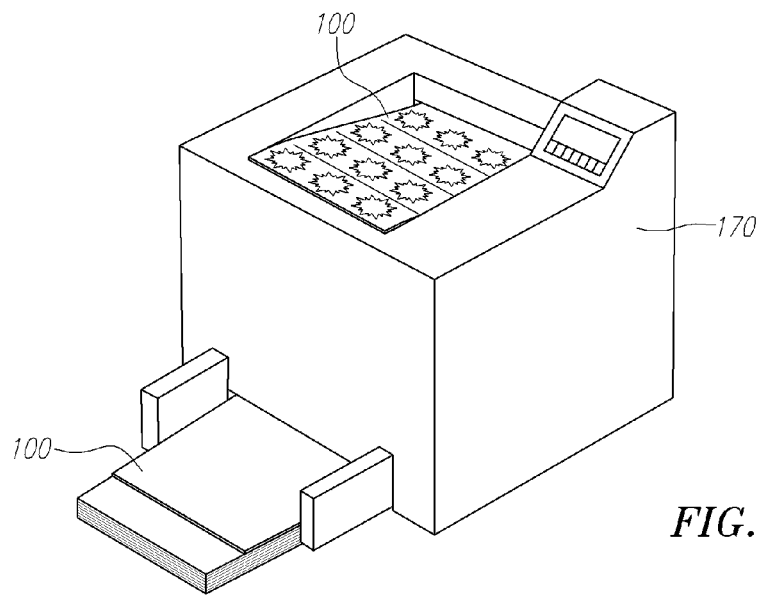
FIG. 3 is a perspective view of a printer (or copier) having a stack of the label sheet constructions of FIG. 1 in the infeed tray and some of the label sheet constructions in the outfeed tray after having passed through the printer and the desired printing done on the labels thereof.
Figure 2:
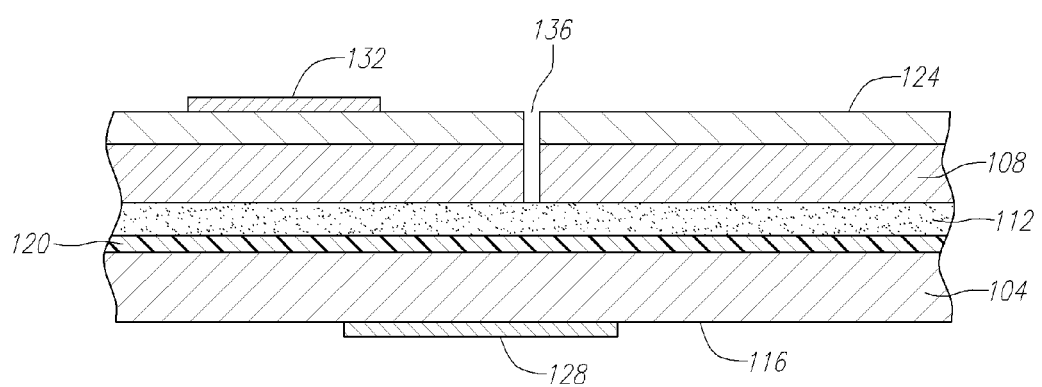
FIG. 2 is an enlarged cross-sectional view through a portion of the construction of FIG. 1.

As depicted in FIG. 1, narrow side strips 160, 164 of the facestock sheet 108 have been removed (as is known in the prior art). The facestock side strips 160, 164 are to improve feeding of the label sheet construction 100 into ink jet printers, such as shown generically in FIG. 3 by printer/copier 170. The sheet sits in a tray in the feeder, which has a small metal or plastic tab resting on the corner of the sheets. In order for the sheets to feed into the printer 170, rotating rubber rollers are pressed against the stack of sheets. The frictional force of the rollers must be sufficient to allow the sheet to deform at the corners sufficiently to allow the top sheet to pass by the corner tab, so that indicia 174 (see, e.g., FIG. 4) can be printed on the labels 144. The removal of the facestock edges increases the flexibility of the sheet and makes it easier for the sheet to deform and pass by the corner tab. However, it is also within the scope of the invention to not remove the facestock sheet side strips 160, 164. The indicia 174 can be custom designed by the user, for example, on his personal computer. It can include letters, numbers, symbols and/or the like.

Figure 4:
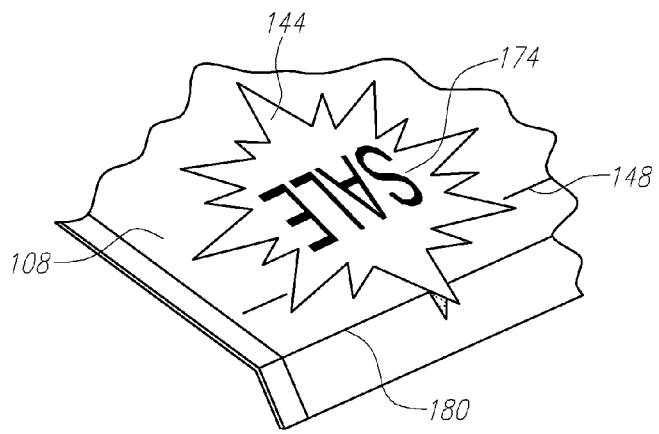
FIG. 4 is an enlarged perspective view of a corner of one of the printed label sheet constructions of FIG. 3 after having been removed from the outfeed tray of the printer of FIG. 3 and showing the sheet being folded along an outer fold line thereof.
Figure 5:
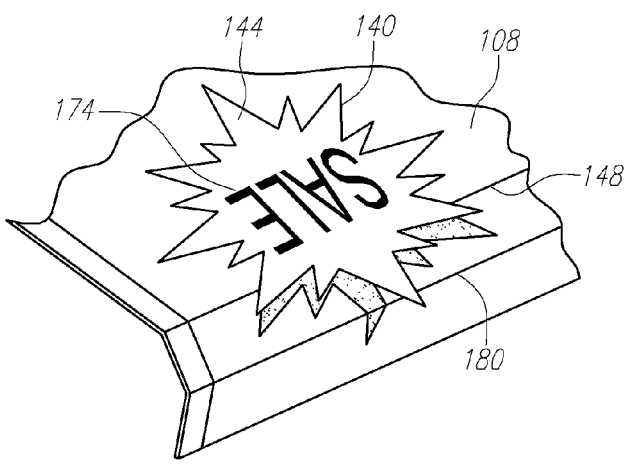
FIG. 5 is a view similar to FIG. 4, but showing the sheet being further folded along an inner fold line thereof to expose a larger portion of the printed label.

The labels 144 can have a burst shape, and this label shape as described and illustrated in the drawings is another invention of this disclosure. The burst shape of the label 144 preferably has alternating long and short points. Because of the shape of the burst label (long points, alternating shorter points), it is preferred to have two parallel cuts or weakened fold lines 148, 180, as depicted in FIG. 1, for each row of labels on the sheet construction 100. While the top cut 180 releases the top of the highest point, the lower cut 148 releases the two long points on either side of the top central point, as well as the shorter points in between. It is necessary or preferable to lift this much of the label 144 prior to attempting to remove it in order to keep the label from tearing. FIGS. 4 and 5 illustrate how the label 144 is so lifted (or separated from the liner sheet) using the two fold lines 148, 180. In applications for other shapes (see FIGS. 7 and 8), the two cut scenario would likely not be as needed.

The present invention includes both single and double fold line embodiments, as well as cuts in both the vertical and/or horizontal directions. Other possible shapes where this invention can be used are any irregularly shaped labels, round labels, oval labels or rectangular labels that have a significant matrix between the labels (commonly called "full bleed labels," where the print can extend beyond the edge of the label without printing on neighboring labels). However, burst labels are probably the preferred application for this double fold line feature.

The fact that the plurality of parallel weakened lines (or fold lines or cut lines or a single weakened line) are on the facestock sheet 108 and not the release liner sheet 104 has a number of advantages. A first advantage is that converting (the manufacturing process) is simplified, in that all die cutting takes place with a single die on a single side of the sheet (eliminating the need for scoring or cutting the liner, and the necessary complications in web path, setup, tooling costs, waste, etc. associated therewith). A second advantage is that the cuts on the sheet are clearly visible to the consumer on the side being viewed during normal usage, so the consumer clearly can see where to fold and understand the removal procedure. A third advantage is that there is no possibility of marking the front of the label that is designed for use in the process of creating the sheet, whereas this is a possibility in creating weakening lines in the liner under the label to be used.

Having a small tie 200 (see, e.g., FIG. 1) where the cut meets the label retains the integrity of the matrix area around the labels, so that when the consumer attempts to remove the labels, small sections of the matrix around the liner do not come off of the sheet at the same time. This is a desirable, but not necessary feature, depending on the configuration.

The line 180 is preferably discontinuous (see reference numeral 210 in FIG. 1) so that the folding force is similar for both cuts. This prevents one cut (or fold line or weakened line) from folding and the other cut remaining unfolded, meaning extra effort would be required to fold at the second cut line. In other words, the longer cuts would normally fold first and the spaces 210 prevent this from happening.

The label sheet construction 100 is preferably produced on a "converting press," pursuant to the following steps.

a. A facestock/adhesive/silicon coated liner laminate is placed in roll form on the unwind of the converting press.

b. The laminate material is fed through a series of rollers in the converting press whereby the material passes by a web guide that aligns the material in the press. It then passes through a printing station that may or may not print text and/or graphics on one side of the material, heretofore called a web. The web then may or may not pass through a device (a "turnbar") that turns the web over. The web then passes through a second print station that may or may not print on the other side of the web.

c. The web next passes though the die station. The die station includes a bottom a steel roller (an "anvil roller"), which is smooth, highly concentric, and very flat in the cross a machine direction, and a rotary die, which is a steel cylinder with a flat cylindrical surface on either side and a pattern of sharp blades across the middle and around the circumference of the die (corresponding to where the face of the label sheet has cuts). The die is positioned directly above the anvil roll, and the die rests on the flat surfaces ("bearers") on either side of the die. The blades are made such that they are a distance above the anvil roll that corresponds to a percentage of the silicon liner thickness (typically about 70%). As a result, when the web passes between the anvil roll and the die (the bearers are on either side of the web and do not touch the web), the blades cut through the facestock and the adhesive and press against the liner (which is slightly compressible), but do not cut through the liner.

d. The web then may pass through additional die stations. It next passes though a matrix removal area, wherein a portion of the facestock may or may not be removed from the web by pulling a portion of the face material away from the web and around one or more rollers, after which it is either wound up onto a roll or transported by vacuum into a waste container. This is how the facestock at the narrow side edges of the sheet are removed.

e. The web then goes into a cutoff or "sheeter" station that has a die and anvil. The die contains a single continuous cross machine blade (usually the blade is removable and can be easily replaced) which contacts the anvil roll on each revolution, and thereby cuts the web into individual sheets.

f. The sheets then are transported by belts and pulleys away from the sheeter station and are stacked either by allowing them to fall one upon another in a continuous stream or by feeding them into wheels ("starwheels") that have spiral shaped cuts that receive and decelerate the sheets, which turn as the sheets are received. In the latter design, there are fixed posts between the starwheels, whereby the sheets hit the posts and are stripped out of the starwheels and drop into a vertical stack. This vertical stack is then ejected on a periodic basis and fed onto secondary conveyor belts, where they are either removed for hand packing or fed into a secondary packaging machine, which places the product into packets or boxes.

Other manufacturing processes as would be apparent to those skilled in the art from this disclosure are also within the scope of the present invention and included herein.

As previously stated, the present invention is particularly well suited to labels having burst shapes because the points thereof are susceptible to tearing when the labels are being peeled off, without the fold lines of the invention. However, the invention covers essentially all label shapes. Examples of other label shapes are round labels 220 as shown in FIG. 7 and rectangular (address or return address) labels 230 as depicted in FIG. 8.

Figure 6:
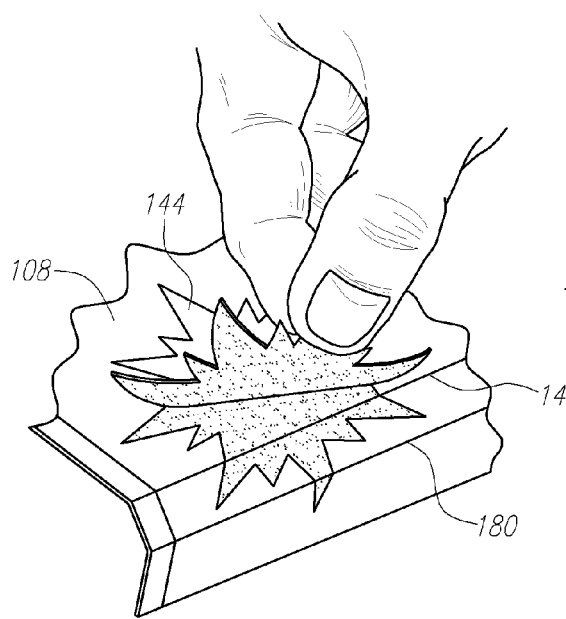
FIG. 6 is a view similar to FIG. 5, showing a user grasping the large exposed portion of the printed label and peeling it off of the sheet.
Figure 7:
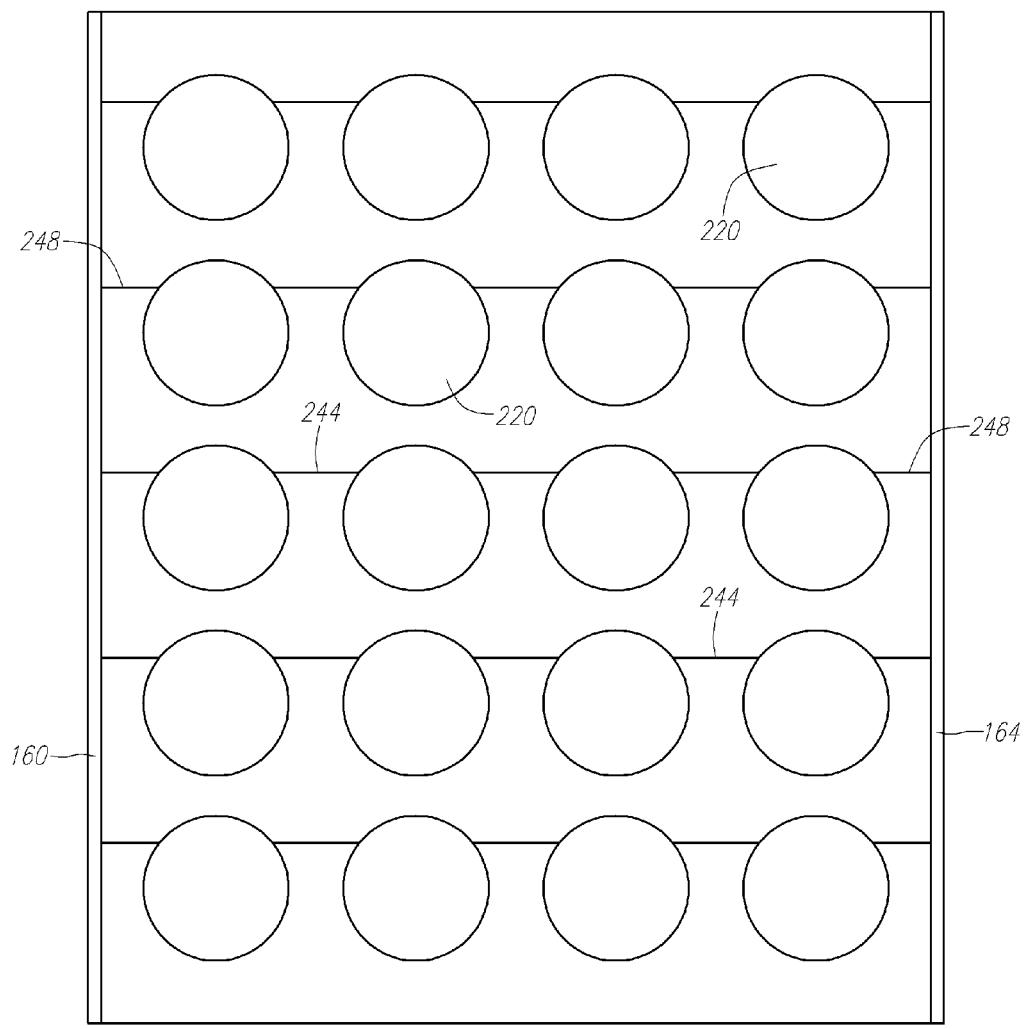
FIG. 7 is a view similar to FIG. 1, showing a first alternative label sheet construction.

Referring to FIG. 7, the round (die cut) labels 220 can be in a four-by-five array on the sheet. The weakened separation fold lines 148 are preferably die cut lines through the facestock sheet 108. They may engage the die cut lines defining the labels 220 or be separated therefrom by a small "tie." The lines extend between adjacent labels in a row (see line 248), and also between array side labels and the side edge of the facestock sheet (see line 248), but preferably not engaging the edge. Folding the portion of the sheet construction above the line backward, separates the top (approximately one-quarter) of the label 220 from the underlying liner sheet. Similar to the burst labels (see FIG. 6), the exposed or separated label portion can then be easily grasped and the label 220 peeled off the liner sheet 104 for application to the desired surface.

Figure 8:
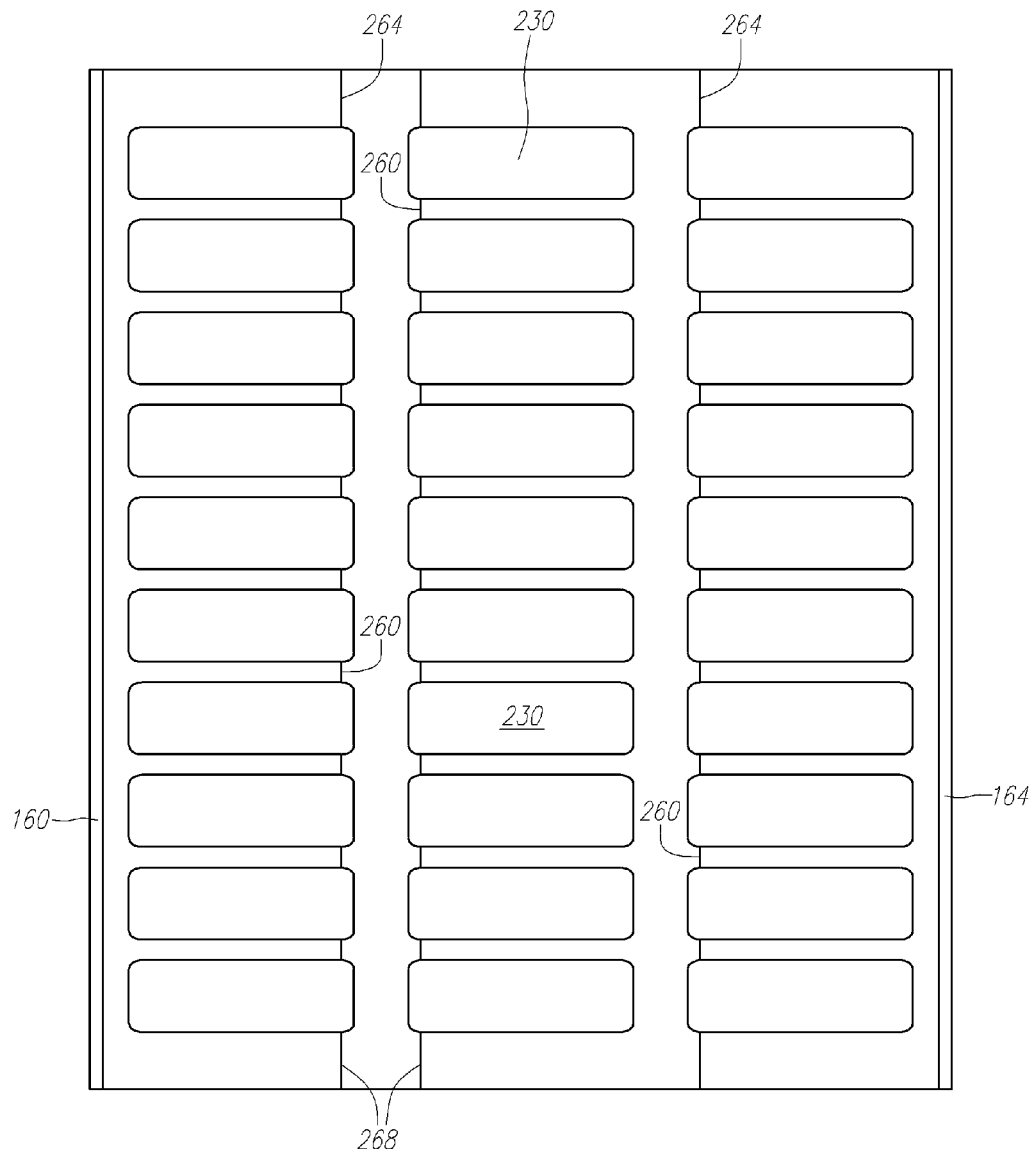
FIG. 8 is a view similar to FIG. 1, showing a second alternative label sheet construction of the present invention.

FIG. 8 shows rectangular labels 230 oriented width-wise on the sheet in three columns and ten rows, as an example. The weakened fold (die cut) lines 140 extend lengthwise on the sheet from label to label (see line 260) and from top and bottom label (almost) to top and bottom edges of the sheet (see lines 264, 268). When the sheet construction is folded back on the fold line, a very narrow tab portion (may be one-tenth the length of the label) is separated. Alternatively, the fold lines can extend widthwise on the sheet, similar to the round and the burst labels previously discussed (or the fold lines on the latter two mentioned label sheets can extend lengthwise). The fold line concept can be used on sheets which have only a few or even a single label thereon.

From the foregoing detailed description, it will be evident that there are a number of changes, adaptations and modifications of the present invention which come within the province of those skilled in the art. The invention includes any combination of the elements from the different species and/or embodiments disclosed herein. However, it is intended that all such variations not departing from the spirit of the invention be considered as within the scope thereof.

We claim:

1. A label sheet construction comprising:
a liner sheet including a silicone release layer;
a facestock sheet adhesively coupled to the silicone release layer;
at least one through-cut line in the facestock sheet that defines a label; and
at least first and second weakened fold line segments in the facestock sheet but not in the liner sheet;
wherein:
the first and second weakened fold line segments extend from the label but do not extend through the label, and when the facestock sheet is folded along the first and second weakened fold line segments, the liner sheet is configured to fold beneath the first and second weakened fold line segments and beneath the label.

2. The label sheet construction of claim 1, wherein the liner sheet is configured to be folded linearly beneath the label.

3. The label sheet construction of claim 1, wherein the facestock sheet is adhesively coupled to the liner sheet with an adhesive layer.

4. The label sheet construction of claim 3, wherein the adhesive layer includes a pressure sensitive adhesive.

5. The label sheet construction of claim 1, wherein the liner sheet is further configured to facilitate a portion of the label to release from the liner sheet when the liner sheet is folded.

6. The label sheet construction of claim 1, wherein the label sheet construction is configured to be sheet-fed through a printer or copier to print indicia on the label.

7. The label sheet construction of claim 1, wherein the facestock sheet includes preprinted indicia.

8. A label sheet construction comprising:
a liner sheet including a silicone release layer;
a facestock sheet having at least one through-cut line that defines a label;
a pressure sensitive adhesive layer between the liner sheet and the facestock sheet;
at least first and second weakened fold line segments in the facestock sheet but not in the liner sheet;
wherein:
the first and second weakened fold line segments extend from the label but do not extend through the label, and when the facestock sheet is folded along, the first and second weakened fold line segments, the liner sheet is configured to fold beneath the first and second weakened fold line segments and beneath the label to facilitate a portion of the label to release from the liner sheet when the liner sheet is folded.

9. The label sheet construction of claim 8, wherein the facestock sheet includes preprinted indicia.

10. A label sheet construction comprising:
a liner sheet including a silicone release layer;
a facestock sheet adhesively coupled to the silicone release layer;
at least one through-cut line through the facestock sheet that defines a first label; and
first and second weakened fold line segments in the facestock sheet but not in the liner sheet;
wherein:
the first and second weakened fold line segments extend away from the first label but do not extend through the first label, and when the facestock sheet is folded along, the first and second weakened fold line segments, the liner sheet is configured to fold beneath the first and second weakened fold line segments and beneath the first label.

11. The label sheet construction of claim 10, wherein the first weakened fold lines segment is collinear with second weakened fold line segment.

12. The label sheet construction of claim 10, wherein the first weakened fold lines segment is parallel to the second weakened fold line segment.

13. The label sheet construction of claim 10 wherein the at least one through-cut line through the facestock sheet further defines a second label.

14. The label sheet construction of claim 12 wherein one of the first and second weakened fold line segments extends between the first and second labels.

15. The label sheet construction of claim 13, wherein both the first and second weakened fold line segments extend between the first and second labels.

16. The label sheet construction of claim 10, wherein the facestock sheet is adhesively coupled to the liner sheet with an adhesive layer.

17. The label sheet construction of claim 16, wherein the adhesive layer includes a pressure sensitive adhesive.

18. The label sheet construction of claim 10, wherein the label sheet construction is configured to be sheet-fed through a printer or copier to print indicia on the label.

19. The label sheet construction of claim 10, wherein one of the first and second weakened fold line segments includes an end that is spaced a short distance from the label.

* * * * *